Oct. 4, 1966  R. S. GRIFFING  3,276,470
PRESSURE REGULATING VALVE
Filed Sept. 26, 1963

INVENTOR.
Robert S. Griffing
BY
Darby & Darby
his Attorneys

United States Patent Office 3,276,470
Patented Oct. 4, 1966

3,276,470
PRESSURE REGULATING VALVE
Robert S. Griffing, Hermosa Beach, Calif., assignor to Fairchild Hiller Corporation, a corporation of Maryland
Filed Sept. 26, 1963, Ser. No. 311,753
2 Claims. (Cl. 137—505.15)

The present invention relates to a pressure regulating valve and particularly to such a valve which will maintain an output pressure within very narrow limits despite variation in the input pressure extending over a wide range.

In the past regulating valves of the type mentioned above have been constructed, but these valves are not suitable for use in many instances. One such valve utilizes a poppet and a transducer, the transducer being directly connected to the poppet and being subjected to the outlet pressure on one side thereof, a reference spring placed on the opposite side of the valve opposing the force generated by the outlet pressure. However, as is well known, such an arrangement when utilized with a wide range of inlet pressures requires an extremely large transducer area and a consequently large and heavy spring to oppose the force exerted on the transducer. Such a valve is not suitable for use, for example, with a fuel supply system for a rocket where the parts must necessarily be of light weight and small bulk.

Another form of the valve which is capable of maintaining proper regulation of output pressure is of the balance poppet type. These valves, however, require an O-ring or other like seal between an area thereof at which input pressure is present and another area at which output pressure is present. As a result it is difficult to construct such a valve since the high inlet pressures result in leakage through the seal and, in addition, particularly when the valve is small, tolerances must be maintained to such close limits that the valve becomes extremely expensive and the production thereof difficult and complex.

My invention provides a pressure regulator valve which does not have the disadvantages above mentioned, but can be made small in both bulk and weight and does not require close tolerances of the balanced poppet valve, nor is it subject to leakage past the seal as is the case in that known form of pressure regulator. The valve of my invention comprises a poppet and the usual transducer directly connected thereto with the transducer acted upon by a force proportional to the output pressure on one side thereof and by a balancing reference spring on the opposite side thereof.

In addition, by my invention means are provided for balancing the force exerted on the poppet by virtue of the inlet pressure with an equal force in the opposite direction likewise resulting from the inlet pressure, the means of exerting this balancing force being a metallic bellows which does not require the close tolerances of the balanced poppet seal and which is not subject to leakage.

It is an object of the invention to provide an accurate pressure regulating valve which is of small bulk and weight and which does not utilize moving seals and is therefore not subject to leakage and friction losses.

It is another object of my invention to provide such a valve in which the error in regulation is minimized by balancing the force exerted on a poppet as a result of the inlet pressure by opposite force exerted in the opposite direction to thus modify the position of the poppet with respect to its seat only in response to variations in the outlet pressure.

It is a further object of my invention to provide a valve which accomplishes the results indicated above through the use of bellows which may either vary the position of the valve seat relative to the poppet valve proper, or may act to effectively vary the reference spring pressure to compensate for error resulting from variation in input pressure.

Other objects and features of the invention will be apparent when the following description is considered in connection with the annexed drawings, in which, FIGURE 1 is a transverse cross-sectional view of a preferred form of the pressure regulating valve of my invention;

As has been indicated hereinabove, the most common manner of designing a valve to accurately regulate the output pressure within narrow limits despite the fact that the input pressure varies over wide limits is to utilize the well known equation:

$$E = (P_m - P_n)\frac{A_p}{A_t}$$

wherein:
$E$ = error in regulated pressure
$P_m$ = maximum upstream pressure
$P_n$ = minimum upstream pressure
$A_p$ = valve effective area
$A_t$ = transducer effective area The valve effective area is determined by the specifications and depends upon the required flow. It will be seen then that if the error is to be reduced to provide for deviation of but a few pounds per square inch from the desired value, then even though the valve effective area $A_p$ is very small the transducer area will be extremely large if the limits of variation of input or upstream pressure are widely separated. This of course means that for usage in a situation requiring low bulk and low weight such a valve is completely impractical since it requires not only a large area transducer, but also a heavy spring to balance the force against that transducer.

Figure 1:
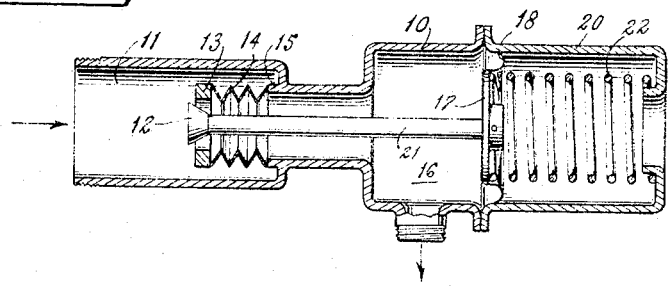

Referring now to the drawings and particularly to FIGURE 1, there is shown therein a valve housing 10 divided into a number of sections. A portion 11 of the housing constitutes an inlet chamber and is provided with a poppet valve 12 which seats against a seat 13 which is supported upon a bellows 14 which is fixed at its opposite end to a rim 15 formed integrally with the housing 10. The section 16 of the housing 10 comprises an outlet chamber which is bounded on one side by a transducer 17, mounted on a flexible diaphragm 18 which is fixed between the housing portion 10 and a second housing portion 20. In the usual manner the poppet 12 has a stem 21 which is fixed to the transducer 17. Mounted in the housing portion 20 is a reference spring 22 which opposes movement of the transducer toward the right.

As indicated in the drawing, when the load on the regulated output remains constant, the poppet 12 is spaced slightly from its seat permitting sufficient flow from the inlet to the outlet chambers to maintain the pressure at the set point. If the upstream or pressure in the inlet chamber 11 increases the force of the poppet 12 tends to move that poppet to the right closing the valve and thus permitting departure from the set or regulated pressure. However, the bellows 14 is designed with a spring rate such that when subjected to the differential of pressure between the inlet and outlet chambers, it contracts at such a rate that the opening remains constant so long as only the inlet chamber pressure varies.

Because of this arrangement it will be seen that despite the fact that the reference spring 22 is compressed, the outlet pressure remains constant. Should the outlet pressure vary while the inlet pressure remains constant, then the reference spring will expand or contract accordingly and the poppet 12 will move away from or toward its seat and maintain the flow at the proper rate to regulate the pressure to preset value.

As indicated in the device of FIGURE 1, the size of the transducer and its reference spring can be selected in accordance with the conditions and space available, the characteristics of the bellows being then selected to balance the forces so that excessive area of the transducer is not required. Thus the valve of this invention operates to regulate to narrow limits, despite wide variations of input pressure and without the necessity for balancing the poppet itself through the use of O-ring seals or the like, having frictional resistance to poppet movement and subject to leakage.

Figure 2:
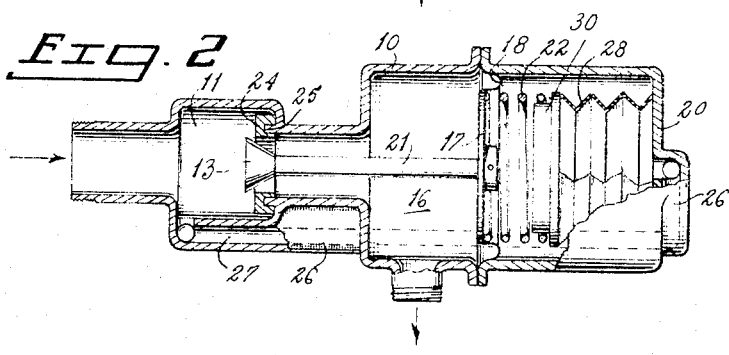
FIGURE 2 is a similar view with portions thereof in elevation in order to show the housing construction of a second form of my invention.

Referring now to FIGURE 2 there is shown a similar arrangement for achieving the results described above in connection with FIGURE 1. In this figure corresponding parts have been given the same reference numerals as in FIGURE 1 and serve substantially the same function.

In FIGURE 2 the valve seat is not movable as was the case in FIGURE 1, but rather a fixed valve seat 24 is provided which is in the usual manner mounted on an axially extending rim 25 forming part of the housing 10. As shown clearly in FIGURE 2, the housing portions 10 and 11 are provided at their lower portions with an outwardly extending generally radial rib 26 in which a passage 27 is formed leading from the inlet chamber 11 to the interior of a bellows 28. Bellows 28 extends between a fixed portion of the housing part 20 and a flanged disk 30. The reference spring 22 in this form of the invention extends between the flange disk 30 and the transducer 17. In operation this device is similar to the device of FIGURE 1. If it be assumed that, as shown, the output pressure is at the regulated value and the poppet 13 slightly off its seat 24, then as the inlet pressure in chamber 11 increases that pressure will be applied to the interior of the bellows 28.

Bellows 28 is of such size and has such an extension rate that the resulting force exerted by it through the spring 22 balances the force exerted by the same pressure upon the poppet 13. Therefore variations in inlet pressure have no effect upon the outlet pressure. However, as will be clear when the outlet pressure varies irrespective of the inlet pressure, the spring 22 contracts or expands accordingly and thus accordingly closes or opens the passage about the poppet.

Figure 3:
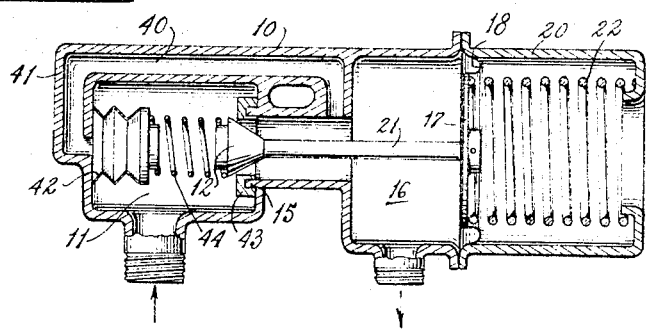
FIGURE 3 is a view of a third form of my invention.

The device of FIGURE 3 is again similar to those previously described and the same reference characters are therefore used for the similar parts.

Housing 10 comprises an inlet chamber 11 and an outlet chamber 16. As in FIGURE 1 a second housing portion 20 is fixed to the first housing portion and a diaphragm 18 is clamped between these two housing portions, this diaphragm being fixed to the transducer 17 against which the reference spring 22 bears.

A passage 40 is formed in a radially extending rib 41 of the housing 10 connects the output chamber 16 with the interior of a bellows 42 located in and fixed to the left hand wall of the inlet chamber 11. As before, the poppet 12 is connected by means of stem 21 to the transducer 17. Poppet 12 is provided with a seat 43 which is mounted in the usual manner upon a rim 15 integral with the housing. Completing the construction a light spring 44 extends between the right hand closed end of bellows 42 and the left hand end of poppet 12.

As before the poppet is shown slightly off its seat in a position which it would occupy when the inlet and outlet pressures were constant, the spacing of the poppet seat being just sufficient to permit flow to maintain the outlet pressure. If the inlet pressure rises while the outlet pressure remains constant, the force against poppet 12 will tend to move it in the right hand direction. However, the differential pressure applied to the bellows 42 will tend to collapse that bellows thereby reducing the force exerted on the poppet by the spring 44. As a result the balance between the force on the transducer 17, due to the outlet pressure, and the force on that transducer exerted by the reference spring 22, will be maintained.

However, the spring rate of the bellows 42 is such that a resultant force to the right will be exerted on the poppet 12 causing the poppet to approach its seat and maintain the passage open sufficiently to permit fluid flow at the same rate as previously.

Figure 4:
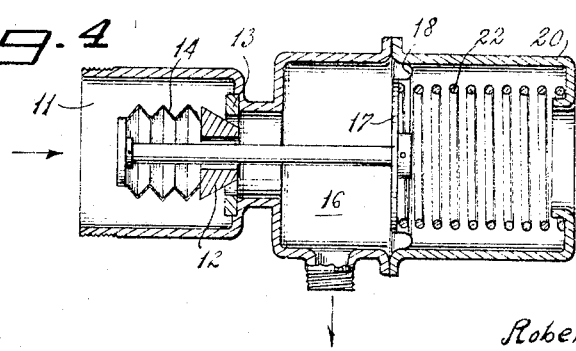
FIGURE 4 is a view of a still further form of my invention which is in many ways similar to the form of FIGURE 1.

The embodiment of my invention illustrated in FIGURE 4 is extremely similar to that of FIGURE 1. In this instance the poppet 12 is carried on the stem 21 by the expansion bellows 14, the valve seat being fixed to the housing 10. The operation of the pressure regulator of FIGURE 4 is then exactly like the operation of the regulator of FIGURE 1 save that instead of the seat moving to maintain the proper flow area the poppet 12 moves with respect to the seat to maintain that area constant.

As will be apparent from the above the pressure regulator of this invention in any of the embodiments shown is particularly adapted to situations wherein a pressure reservoir is utilized to supply pressure fluid over a long period of time without replenishment of the reservoir. Thus as the pressure in the reservoir falls, the regulated output pressure is maintained constant which, as explained hereinabove, is impossible utilizing prior art devices without either increasing the bulk and weight of the pressure regulator or utilizing sliding seals which result in undue complexity and in leakage and friction losses.

A typical use of the pressure regulator of my invention is in the pressuring of the fuel supply for a rocket where the pressure reservoir obviously cannot be replenished and where it is essential that the regulator be reliable and of small size.

The aforementioned description has utilized a bellows as the compensating device. This choice was made for purposes of discussion. Any equivalent device or combination of devices which provide the same function would perform equally well. When bellows is used in the claim, it is to be understood that this term covers such other equivalent devices. The bellows provides an effective spring rate and effective area; these could be supplied by a piston and spring, for example. Other equivalents are metal diaphragms, flexible portions of the regulator housing, and fabric diaphragm and spring combination.

While I have described a preferred embodiment of the invention, it will be understood that I wish to be limited not by the foregoing description, but solely by the claims granted to me.

What is claimed is:

1. A pressure regulating valve comprising, in combination, a housing having inlet and outlet chambers, a poppet valve comprising a poppet and poppet seat, a passage between said inlet and outlet chambers, a transducer forming a portion of said outlet chamber wall, a reference spring exerting force on said transducer opposite to the force of the outlet pressure in said chamber, a poppet stem extending from said transducer through said passage into said inlet chamber, means mounting said poppet on said stem, means supporting said seat on said housing at the inlet chamber end of said passage in position to cooperate with said poppet, said poppet being acted upon by a force proportional to the pressure in said inlet chamber to vary its position relative to said seat, and said support means includes a bellows interconnecting said seat and said housing, said bellows being acted upon by the inlet and outlet pressures to cause said bellows to contract and expand with instantaneous differences between inlet and outlet pressures to thereby alter the position of said poppet relative to said seat and adjust the flow through said passage to maintain the outlet pressure at a value determined by said reference spring.

2. A pressure regulating valve comprising, in combination, a housing having inlet and outlet chambers, a poppet valve comprising a poppet and poppet seat, a passage between said inlet and outlet chambers, a transducer forming a portion of said outlet chamber wall, a reference spring exerting force on said transducer opposite to the force of the outlet pressure in said chamber, a poppet stem extending from said transducer through said passage into said inlet chamber, said poppet being mounted on said stem, said poppet being acted upon by a force proportional to the pressure in said inlet chamber to vary its position relative to said seat, an expansible bellows mounted on said housing, said bellows extending about said valve stem within said inlet chamber and being exposed to outlet pressure on the interior thereof and inlet pressure on the exterior thereof, said poppet seat being mounted on the free end of said bellows whereby said bellows contracts and expands with instantaneous differences between inlet pressure and outlet pressure to adjust the position of said poppet seat relative to said poppet and said stem to thereby adjust the flow rate through said valve and maintain the output pressure at a level determined by said reference spring.

References Cited by the Examiner

UNITED STATES PATENTS

| | | | |
|---|---|---|---|
| 1,450,236 | 4/1923 | Anderson | 137—505.47 X |
| 1,967,981 | 7/1934 | Thomas | 137—505.13 X |
| 2,651,147 | 9/1953 | Eichelman | 137—505.18 X |
| 2,897,833 | 8/1959 | Seeler | 137—505.13 X |
| 3,033,229 | 5/1962 | Ramage | 137—505.15 X |
| 3,136,329 | 6/1964 | Issbrucker | 137—505.18 X |
| 3,137,308 | 6/1964 | Machlanski | 137—505.15 X |
| 3,137,312 | 6/1964 | Hanes | 137—505.15 |

FOREIGN PATENTS 1,044,296    6/1953    France.

WILLIAM F. O'DEA, *Primary Examiner.*

ISADOR WEIL, *Examiner.*

H. WEAKLEY, *Assistant Examiner.*